United States Patent

Yanagi et al.

[15] 3,652,168
[45] Mar. 28, 1972

[54] ELECTRIC EXPOSURE METER

[72] Inventors: Akio Yanagi; Shoichiro Kakuta, both of Tokyo, Japan

[73] Assignee: Minolta Camera Kabushiki Kaisha, Minami-ku, Osaka, Japan

[22] Filed: June 16, 1970

[21] Appl. No.: 48,903

Related U.S. Application Data

[63] Continuation of Ser. No. 634,320, Apr. 27, 1967, abandoned.

[30] Foreign Application Priority Data

Apr. 29, 1966 Japan..................................41/27268

[52] U.S. Cl............................356/21 S, 95/10 C, 356/226
[51] Int. Cl. .........................................G01j 1/46, G01j 1/44
[58] Field of Search............................356/215, 226; 95/10 C

[56] References Cited

UNITED STATES PATENTS

| 2,208,027 | 7/1940 | Gorlich | 356/215 |
| 2,360,082 | 10/1944 | Stone | 356/215 X |
| 2,765,703 | 10/1956 | Ward et al. | 356/215 |
| 3,049,050 | 8/1962 | Thomas | 356/215 |
| 3,063,354 | 11/1962 | Matulik et al. | 95/10 C |
| 3,111,889 | 11/1963 | Quednow | 356/226 X |

Primary Examiner—Ronald L. Wibert
Assistant Examiner—Warren A. Sklar
Attorney—Anthony A. O'Brien

[57] ABSTRACT

An electric exposure meter for storing the brightness of a photographic object as an electric voltage of a magnitude corresponding thereto in order to control the exposure time by using the voltage thus stored.

7 Claims, 5 Drawing Figures

PATENTED MAR 28 1972 3,652,168

ELECTRIC EXPOSURE METER

This application is a continuation of application Ser. No. 634,320, filed Apr. 27, 1967, now abandoned.

This invention is related to an electric exposure meter, more particularly to an electric exposure meter usable together with an electronic shutter, which is preferably mounted on a through the lens type camera hereinafter referred to as a "TTL" camera. Such cameras include, for example, single lens reflex camera.

There have been proposed so-called electronic shutters for electrically determining shutter speed or exposure time. A known electronic shutter includes an electric circuit comprising, in series, an electric power source, a switch adapted to open and close responsive to the movement of shutter blades, a photoconductive element for receiving light from a photographic object, said photoconductive element having a variable resistance responsive to the intensity of the light received thereby, and a capacitor. In such electronic shutter, upon depression of a shutter button, a shutter sector is opened by an electromagnet, and at the same time said switch is closed to complete the aforesaid electric circuit. In this case, the capacitor is charged until the voltage across it reaches a certain predetermined value, and then the capacitor is discharged. A current due to the capacitor discharge actuates an electromagnet for closing the shutter sector, so that the shutter is closed to complete the exposure. The time necessary for charging the capacitor of such electronic exposure meter up to a certain predetermined voltage varies in accordance with the brightness of the photographic object, because the electric resistance of the photoconductive element is changed responsive to the brightness of the light received by the element from the photographic object, and hence, the duration of the shutter opening or the exposure time is determined according to the brighness of the photographic object.

In an electronic eye camera having such electronic shutter, it is made possible to dispense with a complicated exposure control mechanism of conventional electric eye cameras, by taking advantage of the fact that the entire opening and closing operation of the shutter blade of the electronic shutter can be electrically controlled.

Such electronic shutter, however, has a disadvantage in that the photoconductive element thereof must be disposed to the light until the entire exposure is completed. Accordingly, such electronic shutter cannot be mounted on a TTL type monocular reflex camera, because the exposure in this type camera is determined by a photoconductive element located at a suitable point in the light path in the view-finder thereof for measuring the brightness of light passing through a photographing lens means, which light path during the brightness measurement is changed from that during exposure by means of rotation of a mirror.

Therefore, an object of the present invention is to provide a TTL type exposure meter for a monocular or single lens reflex camera having a focal plane shutter.

According to the present invention, the light from a photographic object, which passes through a photographing lens of a camera, is delivered to a photoconductive element located at a suitable position of the light path of a viewfinder thereof to generate electricity. The electricity thus generated is measured by a voltmeter and stored in a suitable storing means as a capacitor as a charge therein. The electricity thus stored is used for controlling the start of the motion of the rear plane of the focal plane shutter after the front plane thereof is moved.

Other objects and a fuller understanding of the present invention may be had by referring to the following description taken in conjunction with the accompanying drawings, in which.

Figure 2:
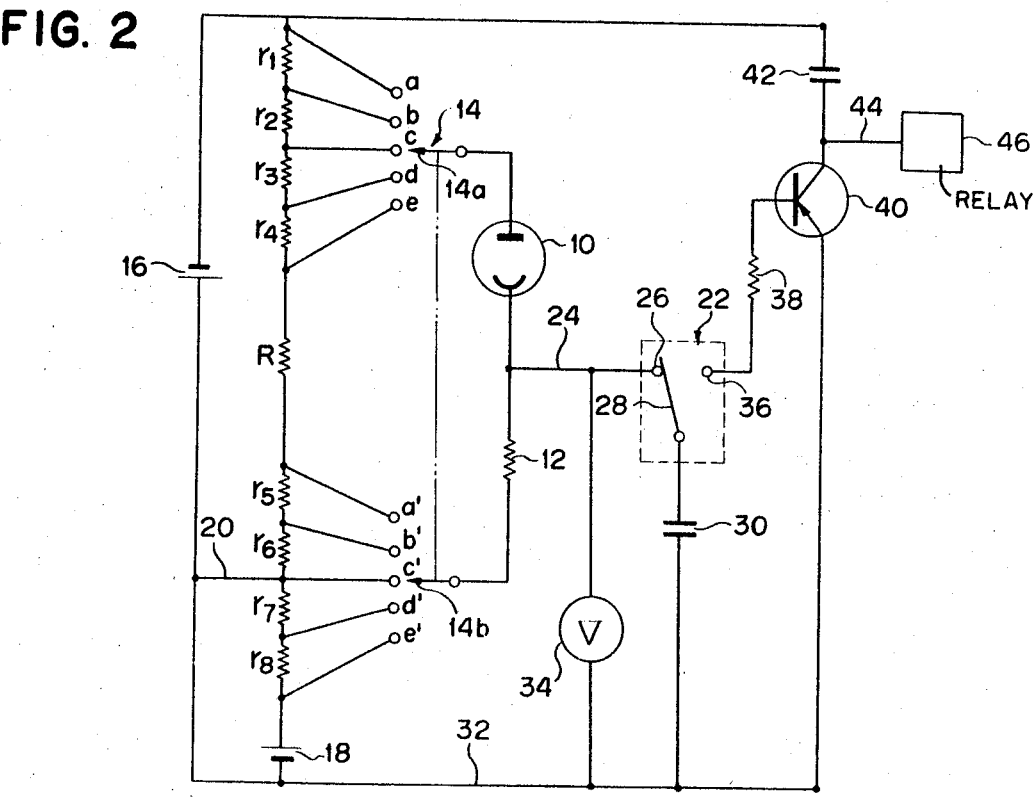
FIG. 2 is an electric circuit diagram of an embodiment of the present invention.
Figure 1:
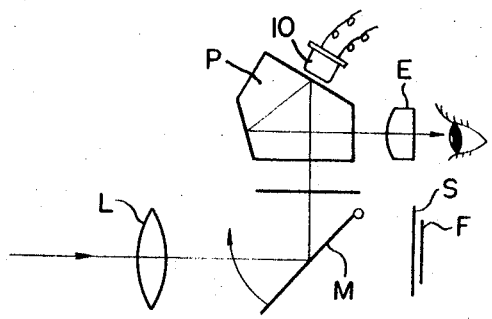
FIG. 1 is a diagrammatic illustration of the light path in a view-finder of a monocular reflex camera, on which an exposure meter according to the present invention can be mounted.
Figure 3:
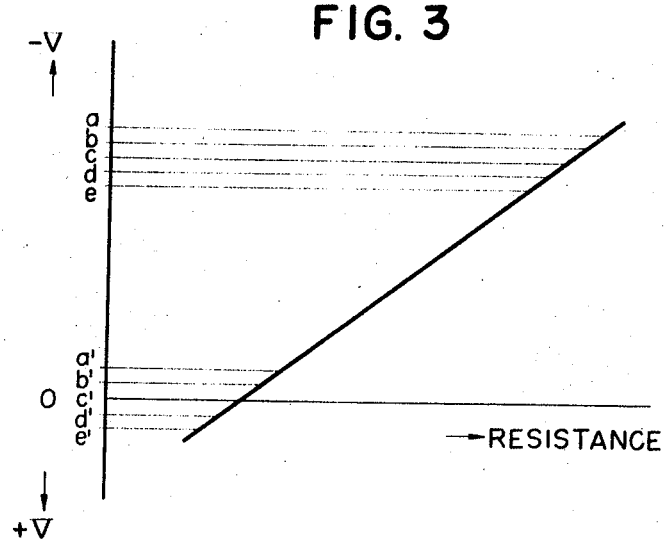
FIG. 3 is a graph illustrating resistance-terminal voltage characteristics of a light receiving element.

Referring to FIGS. 1 to 3, symbols L, M, P, E, S, and F represent respectively a photographing lens, a a mirror adapted to rotate as shown by an arrow during exposure, a penta-prism, an eye-piece, a focal plane shutter, and a film. A photoconductive element 10 is, for instance, made of cadmium sulfide (CdS), and a resistor 12 is connected in series with the photoconductive element 10. The photoconductive element 10 and the resistor 12 are respectively connected to rotary contact arms 14a and 14b of a gang-operated dial switch generally depicted by 14, as shown in FIG. 2. The mechanism of the gang-operated dial switch 14 is such that when the rotary arm 14b is positioned respectively at the corresponding terminal $a'$, $b'$, $c'$, $d'$, or $e'$, the arm 14a is positioned at the corresponding terminal as shown in the figure.

The terminal $a$ is connected to one end of a resistor $r_1$, which is negatively biased by a battery 16, the terminal $b$ to the joint between resistors $r_1$ and $r_2$, the terminal $c$ to the joint between resistors $r_2$ and $r_3$, the terminal $d$ to the joint between resistors $r_3$ and $r_4$, and the terminal $e$ to the joint between resistors $r_4$ and R. The corresponding terminals $a'$, $b'$, $c'$, $d'$, and $e'$ are respectively connected to the joint between resistors R and $r_5$, the joint between resistors $r_5$ and $r_6$, the joint between resistors $r_6$ and $r_7$, the joint between resistors $r_7$ and $r_8$, and an end of the resistor $r_8$, which is positively biassed by a battery 18.

The battery 16 is connected to a closed circuit, which traces from the positive terminal thereof to the negative terminal thereof through a lead wire 20, resistors $r_6$, $r_5$, R, $r_4$, $r_3$, $r_2$, and $r_1$. The battery 18 is also connected to a closed electric circuit, which traces from the positive terminal to the negative terminal thereof through resistors $r_8$ and $r_7$ and the lead wire 20.

The joint between the photoconductive element 10 and the resistor 12 is connected to a terminal 26 of a double-throw selective switch 22 through a lead wire 24. A selective arm 28 of the selective switch 22 is normally connected to the terminal 26, and the arm 28 is in turn connected to a capacitor 30 which is grounded through the ground wire 32. A voltmeter 34 is connected to the lead wire 24 in parallel with the capacitor 30 in order to measure the voltage across the capacitor. In this particular embodiment, a capacitor is used, but any other suitable storing means can be also used in the exposure meter according to the present invention.

The other terminal 36 of the selective switch 22 is connected to the base of a transistor 40 through a resistor 38. The emitter of the transistor 40 is connected to the ground wire 32, while the collector thereof is connected to the negative terminal of the battery 16 through a capacitor 42. The collector of the transistor 40 is also connected through a lead wire 44 to a relay 46 of suitable type for starting the rear plane of focal element shutter.

The operation of the circuit of the aforesaid structure will now be described. The selective contact arm 14a of the dial switch 14 is interlocked with a film sensitivity selector mounted on a camera body or a lens cylinder and adapted to cooperate with a lens aperture ring. Let it now be assumed that a film having a sensitivity of ASA 100 is loaded in the camera and the lens aperture $f$ of the camera is set at $f_8$, and the selective contact arms 14a are respectively positioned at terminals $c$ and $c'$ upon setting a film sencitivity selector at ASA 100. Furthermore, it is assumed that the resistors $r_1$ to $r_8$ in the embodiment of FIG. 2 have the same resistance of $r$ ohms and the resistor R thereof has a resistance of R ohms. The numerical value of the resistance $r$ is selected to be identical with the resistance variation of the photoconductive element per unit brightness value (to be referred to as "Bv" hereinafter).

In this case, the voltage between terminals $c$ and $c'$ or the voltage across the selective arm 14a and 14b of the dial switch 14 is given by $(R+4r)i$ volts, as a result of the voltage division by means of resistors $r_1$ to $r_8$ and R. Here, $i$ represents the current flowing through the selective arms 14a and 14b. Due to the fact that the resistance of each of the resistors $r_1$ to $r_8$ is the same, the voltage across the selective arms 14a and 14b of the dial switch 14 is not affected by the position thereof, namely $a—a'$, $b—b'$, $c—c'$, $d—d'$, or $e—e'$, as shown in FIG. 3.

Under such conditions, if a monocular reflex camera having a focal plane shutter together with an exposure meter according towards the present invention is directed to a photographic object, the resistance of the photoconductive element 10 is varied responsive to the brightness of the object of the Bv thereof, and a voltage representative of the Bv of the photographic object is produced in the lead wire 24. The capacitor 30 or a suitable storing means is charged by the voltage on the lead wire 24 through the terminal 26 and the selective contact 28. At the same time, the voltage on the lead wire 24 is read out by means of the voltmeter 34 having a graduation according to shutter speed.

If the voltage generated on the lead wire 24, as detected by the voltmeter 34 falls within the operative range of shutter speed of the camera, a shutter button is depressed. Such depression of the shutter button causes upward movement of the mirror, start of movement of the front plane(not shown) of the focal element shutter, and simultaneously turn-over of the selective arm 28 of the selective switch 22 to the terminal 36 thereof. Thus, the capacitor 30 is discharged through the resistor 38 and the transistor 40, and an electric signal for actuating the rear plane of the focal plane shutter is delivered to the relay circuit 46. After a certain time lag following the start of the front element, the relay circuit 46 actuates a relay (not shown) and starts the rear element (not shown) to complete the exposure. The aforesaid time lag depends on the intensity of the signal from the transistor 40, that is the magnitude of the voltage across the capacitor 30 established by the charge thereof.

Figure 5:
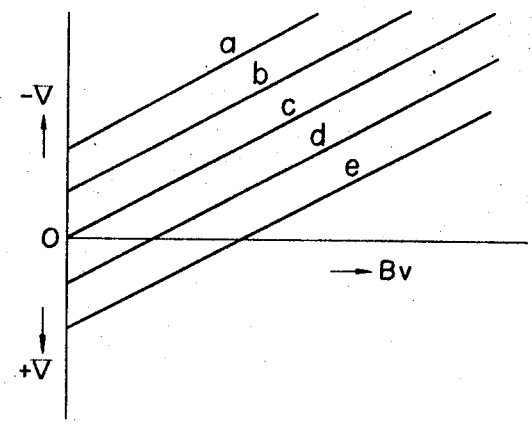
FIG. 5 is a graph showing the relationship between the value of $B_v$ and output voltage.

If a lens aperture ring is turned so as to increase the aperture, the selective arms 14a and 14b of the dial switch 14 are also turned due its interconnection with the lens aperture ring, say to the terminals $b$ and $b'$ respectively. With the selective arms thus moved, the voltage across the arms 14a and 14b is not changed and kept at $(R+4r)i$ volts, however the voltage on the lead wire 24 relative to the ground wire 32 is increased by $ir$ volts (see FIG.5), provided that the intensity of the light delivered to the photoconductive element 10 is kept constant. In effect, the voltage on the lead wire 24 is increased as if the lens aperture were not changed and the brightness of the photographic object is increased by a unit brightness value, i.e., 1Bv. Such increase in the voltage on the lead wire 24 results in an increase of a voltage across the capacitor 30, which causes an intensification of the signal on the relay circuit 46 for starting the rear element of the focal plane shutter. According to the invention, the relay circuit 46 is adapted to start the rear element earlier when a stronger signal is applied thereto, and hence, a faster shutter speed is obtained responsive to the aforesaid increase in the lens aperture.

In a different embodiment of the invention, when the intensity or Bv of the incident light to a photoconductive element 10 is increased, the current flowing through the selective arms can be reduced for producing a weaker signal, and a relay circuit 46 can be so arranged as to result in a faster shutter speed for such weaker signal applied thereto.

On the other hand, in the embodiment as shown in FIG.2, if the lens aperture ring is so turned as to reduce the aperture by one step, and if the selective arms 14a and 14b are moved to the terminals $d$ and $d'$ respectively, then, it is apparent to those skilled in the art that the voltage on the lead wire 24 is decreased by an amount corresponding to the brightness change by a value, provided that the actual intensity of the incident light to the photoconductive element is unchanged, thereby the start of the rear element of the focal plane shutter is delayed for providing a slower shutter speed.

Then, if the sensitivity of the film loaded in the camera is increased to ASA 200, the selective arms of the dial switch are turned accordingly, say to terminals $b$ and $b'$ respectively. Similarly, if the film sensitivity is reduced to ASA 50, the selective arms 14a and 14b are also moved, say to terminals $d$ and $d'$ respectively. Thus, the shutter speed can be adjusted in accordance with the sensitivity of the film loaded in the camera.

Figure 4:
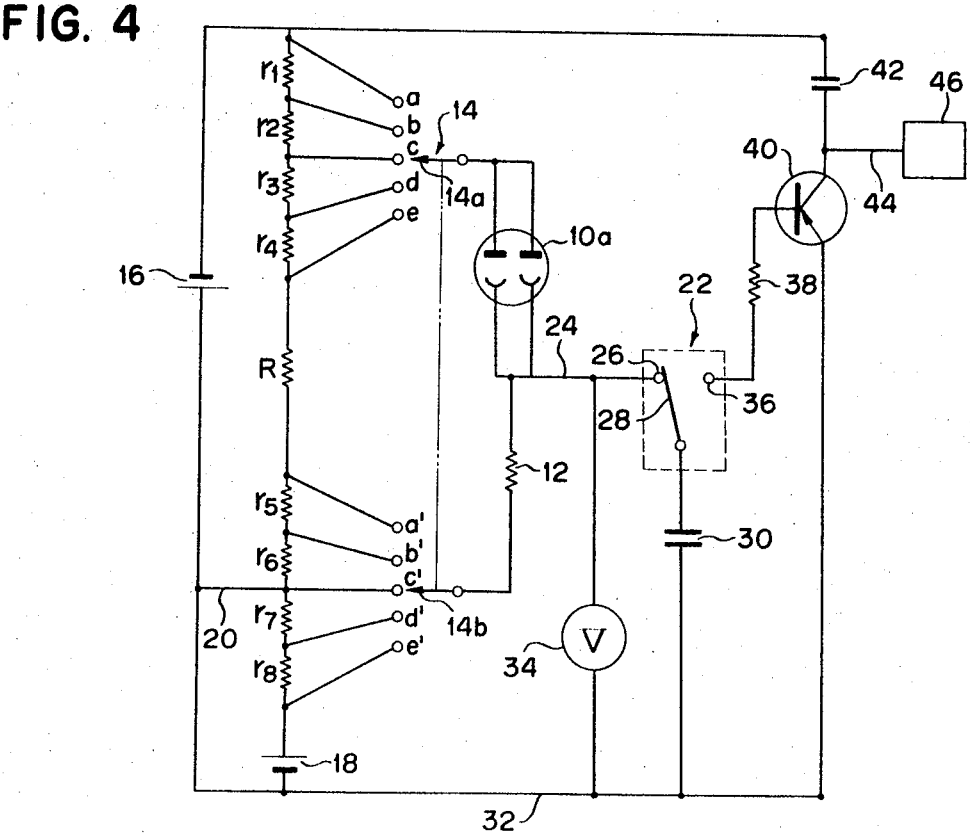
FIG. 4 is an electric circuit diagram of a modification of the embodiment of FIG. 2.

FIG.4 shows a modification of the embodiment of FIG.2, in which a compound photoconductive element 10a is utilized instead of the simple photoconductive element 10, however, the operation of the circuitry is the same as the of FIG.2.

Although the present invention has been described by way of example, it is understood that numerous changes in the details of construction and the combination and arrangement of parts may be resorted to without departing from the spirit and the scope of the invention to. For instance, instead of a series of terminals, variable resistors can be used for achieving continuous control of the lens aperture, or instead of two batteries, one electric power means can be used.

We claim:

1. An exposure measuring system comprising a gang swich including first and second movable contacts mechanically and electrically connected with each other, and two groups of corresponding fixed contacts arranged so that when the first movable contact is engaged with any one of the first group of fixed contacts the second movable contact is engaged with the corresponding fixed contact;

a photoconductive element and a load resistance connected in series, said photoconductive element being connected to said first movable contact while said load resistance is connected to said second movable contact;

two groups of resistances each comprised of a plurality of equal value resistors connected in series, another resistance connected between said two groups of resistances, one end of said series connected resistances being connected to a DC electric source, each of said fixed contacts being connected to one end of an associated resistor so that in any contact position of said gang switch the voltage across the opposite ends of said series connection of the photoconductive element and load resistance is the same; and measuring means connected between the photoconductive element and the load resistance for measuring the voltage across the load resistance;

whereby the output voltage is in linear relation relative to the brightness value of the object as sensed by the photoconductive member.

2. An exposure measuring system according to claim 1 wherein said measuring means comprises a storing means for storing said output voltage for controlling the operation of a shutter of a camera.

3. An exposure measuring system according to claim 2 wherein said measuring means comprises an indicator means for indicating said voltage stored in said storing means.

4. An exposure measuring system according to claim 3 wherein said indicator is a voltmeter.

5. An exposure measuring system according to claim 2 wherein said storing means is a capacitor.

6. An exposure measuring system according to claim 1 wherein said photoconductive element is made of cadmium sulfide.

7. An exposure measuring system according to claim 1 wherein said photoconductive element is a compound photoconductive member.

* * * * *